United States Patent [19]
> Yost

[11] Patent Number: 4,821,908
[45] Date of Patent: Apr. 18, 1989

[54] ON-BOARD REFUELING VAPOR RECOVERY SYSTEM

[75] Inventor: John V. Yost, Trenton, Mich.

[73] Assignee: General Motors Corporation, Detroit, Mich.

[21] Appl. No.: 92,873

[22] Filed: Sep. 3, 1987

[51] Int. Cl.⁴ ............................................. F16K 24/00
[52] U.S. Cl. .............................. 220/86 R; 220/85 VR; 141/59
[58] Field of Search .......... 220/86 R, 86 AT, 85 VR, 220/85 VS; 141/59

[56] References Cited

U.S. PATENT DOCUMENTS

| | | | |
|---|---|---|---|
| 4,625,777 | 12/1986 | Schmidt | 220/86 R X |
| 4,630,749 | 12/1986 | Armstrong et al. | 220/86 R |
| 4,659,346 | 4/1987 | Uranishi et al. | 220/85 VR X |
| 4,706,708 | 11/1987 | Fornuto et al. | 141/59 X |
| 4,707,164 | 11/1987 | Harris | 220/85 VR X |
| 4,714,172 | 12/1987 | Morris | 220/86 R |
| 4,715,509 | 12/1987 | Ito et al. | 220/85 VS X |
| 4,719,949 | 1/1988 | Mears | 220/85 VR X |
| 4,724,861 | 2/1988 | Covert et al. | 141/59 X |
| 4,739,808 | 4/1988 | Schmidt | 220/86 R X |
| 4,742,809 | 5/1988 | Ito et al. | 220/85 VR X |

Primary Examiner—Steven M. Pollard
Attorney, Agent, or Firm—Patrick M. Griffin

[57] ABSTRACT

An onboard refueling vapor recovery system uses a primary venting line from the tank to the canister with an internal valve operated remotely from the filler pipe by the insertion of the fuel nozzle. This eliminates the need for valves and vent lines at the filler neck, giving a simpler and more compact package.

1 Claim, 1 Drawing Sheet

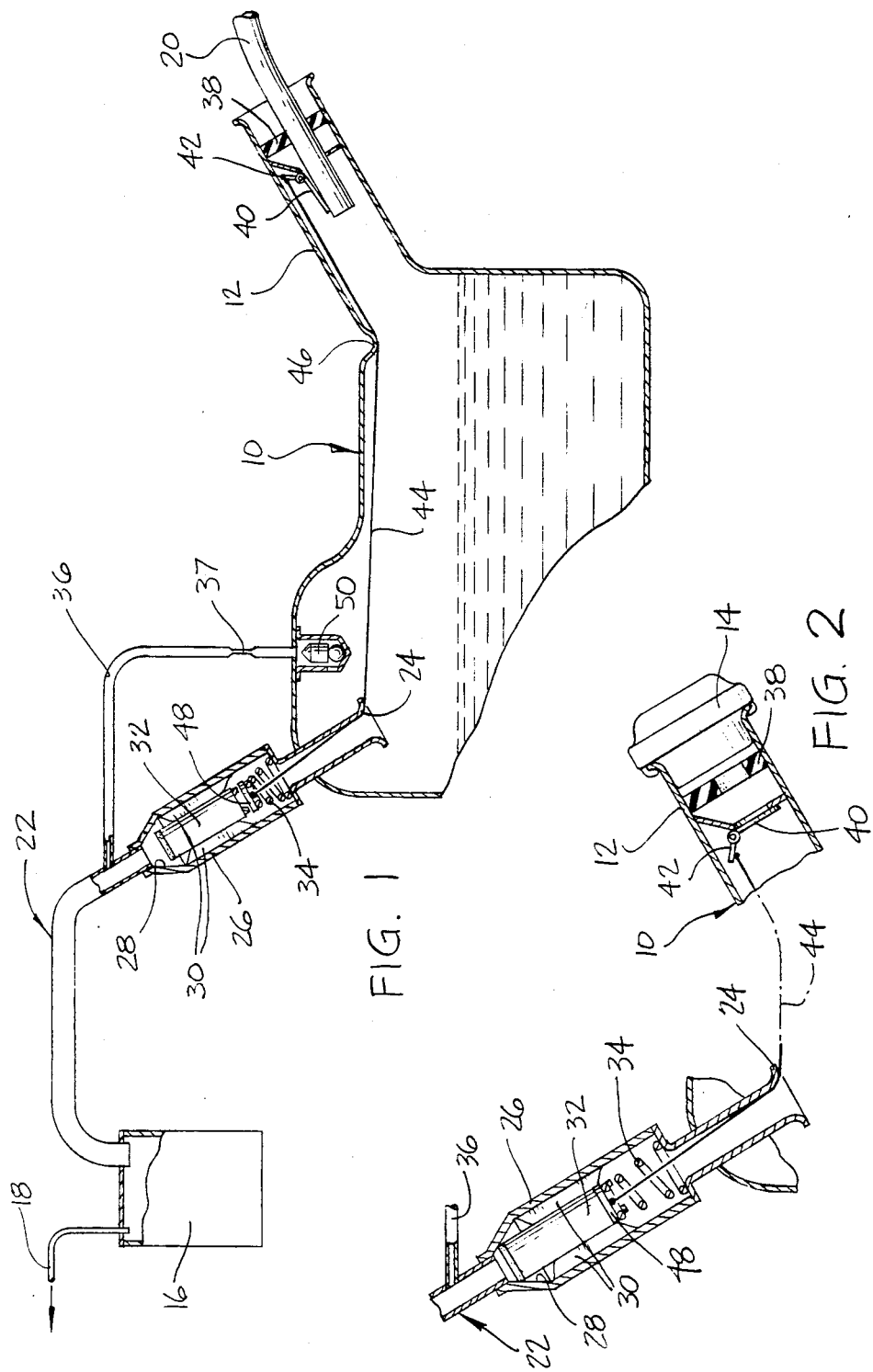

ON-BOARD REFUELING VAPOR RECOVERY SYSTEM

BACKGROUND OF THE INVENTION

Conventional US production motor vehicles today include fuel systems in which a canister containing an adsorbent bed of activated charcoal granules is used to recover fuel vapors that would otherwise be lost to atmosphere. The fuel vapors so recovered include those produced from the carburetor bowl in conventionally aspirated engines, and the vapors produced in the fuel tank as it sits, the so called diurnal losses, which vapors must be vented to control tank pressure. Instead of venting the diurnal tank losses to atmosphere, they are now vented to and stored in the canister, from which they are later purged and sent to the engine air intake to be burned. Another not inconsiderable source of vapors from the fuel tank are those that are displaced from the empty tank volume during refueling. These have to be vented somewhere, in order to prevent the pressure in the tank from building and restricting the inflow of fuel. Typically, these fill loss vapors are vented to atmosphere, either through a separate vent line, or out the end of the filler pipe, or both.

Proposed new regulations that would require the recovery of the fill loss vapors as well as the diurnal loss vapors have stimulated research and patent activity directed at new systems that would collect and store the fill loss vapors in the same canister. In the public debate over whether the responsibility for the recovery of fill loss vapors should rest with the automobile companies or with the oil companies, such systems have come to be referred to as "on board" systems, meaning that they are part of the vehicle, as opposed to being part of the filling station fuel pump apparatus. Several patents for various on board vapor recovery systems have issued already, and more certainly will in the future. Although they have not yet been generally adopted in production, the typical proposed on board system includes a seal in the filler pipe, and a valve, usually contained in a housing on the side of the filler neck, just below the open end thereof. A vent line runs from the valve housing to the canister. As the filler nozzle is inserted, it wipes through the seal, blocking the flow of vapors out of the end of the filler pipe, and also opens the valve by engaging some mechanism near the housing. Alternatively, removal of the cap alone opens the valve. After valve opening, fill loss vapors that would normally have exited the now blocked filler pipe are forced to vent through the valve housing and vent line to the canister. Other systems add a second line from the tank to the filler pipe that enters the filler pipe below the seal and valve housing, so that vapors displaced from the filling tank can flow out of the tank through the second line, into the filler pipe and then out, without having to pass the junction of the tank and filler pipe. A drawback of such systems is the number and expense of the various vent lines. Another potential drawback is in packaging. If the filler pipe is at the back of the tank, and the canister at the front, then the various lines running from the filler pipe to the canister will be long and heavy. Likewise, the valve housing may occupy a significant volume on the side of the filler pipe.

SUMMARY OF THE INVENTION

The invention discloses an on board fill loss recovery system in which no filler pipe valve or vent lines running from the filler pipe to the canister are necessary, providing a simpler, more economical, and more compact system. The invention is disclosed in a vehicle fuel system in which the filler pipe is at the rear of the fuel tank, and the vapor storage canister at the front. A primary tank venting line runs directly from the front of the tank to the canister, and has a diameter large enough to allow the fuel vapors displaced from the filling tank to quickly vent therethrough to the canister. A spring loaded valve located inside the primary venting line between the tank and canister is normally biased closed against a valve seat, blocking any vapor flow through the primary vent line. To accommodate diurnal losses without encouraging vapor formation in the tank, a secondary tank venting line of significantly smaller diameter runs from the front of the tank into the primary venting line at a point between the canister and the valve. There are no lines running from the filler pipe to the canister, and the primary and secondary vent lines can be relatively short, since they run directly from the front of the tank to the front mounted canister.

While the filler pipe contains no valve, housing or venting line inlets, it does contain a wiping seal sized so as to surround the inserted filler nozzle and a rotatable lever that is pushed down by the insertion of the fuel nozzle. A cable running from the lever, down the filler pipe and through the tank to the valve pulls the valve down from its seat. Therefore, during fill, the displaced vapors can quickly vent from the tank up the large diameter primary vent line to the canister. Otherwise, vapor flow from the tank to the canister takes place only through the small diameter tank venting line. The overall configuration and weight of the system is essentially the same as a conventional system, since there are no external valves or actuators, and the vent lines are relatively short.

It is, therefore, an object of the invention to provide an on board vapor recovery system without the use of valves within the filler pipe or long vent lines running to and from the filler pipe.

It is another object of the invention to eliminate the vent lines running from the filler pipe by providing instead a vent line that runs directly from the tank to the canister, a valve which is normally closed but which is openable by a remote actuator that is operated by insertion of the fuel nozzle.

It is another object of the invention to provide a primary venting line that is large enough to allow displaced tank vapors to quickly vent during fuel fill, and a short secondary venting line of smaller diameter that by passes the valve in the primary line to allow the tank to vent at times other than during fill.

DESCRIPTION OF THE PREFERRED EMBODIMENT

These and other objects and features of the invention will appear from the following written description, and from the drawings, in which:

FIG. 1 is a schematic view of a vehicle fuel system incorporating a preferred embodiment of the invention, and illustrating its operation during refueling;

FIG. 2 is a schematic view of selected portions of FIG. 1, illustrating the situation at times other than during refueling.

Referring first to FIG. 1, a vehicle fuel system is illustrated which has a fuel tank 10 with a filler pipe 12 closed by a cap 14 and a vapor storage canister 16. A purge line 18 runs from canister 16 to an engine combustion air intake, not shown, so that stored fuel vapors may be burned in conventional fashion. Upon the removal of cap 14, filler pipe 12 receives a standard nozzle 20 therein incident to filling tank 10, which displaces fuel vapors from tank 10. Filler pipe 12 is located at one end of tank 10, here the, back, while canister 16 is at the opposite end or front of tank 10. There may be other situations where the canister 16 must be mounted relatively remote from filler pipe 12. The invention provides a compact means for venting the displaced tank vapors to the canister 16 which is well suited to such situations.

Still referring to FIGS. 1 and 2, a primary tank venting line designated generally at 22, which is basically a round tube of metal or suitable plastic, runs directly from the front of tank 10 to canister 16. Specifically, primary venting line 22 runs from a flared end 24 that is located at a fairly high point inside of tank 10 out the front of tank 10 to canister 16. Primary venting line 22 also includes an enlarged section just above the point where it exits tank 10 that provides a cylindrical valve housing 26. Housing 26 tapers into the rest of line 22 to provide a conical valve set 28. Housing 26 also has a plurality of guiding ribs 30 therein, for a purpose described below. The primary venting line 22, even at its smallest cross section, has an area sufficient to allow fuel vapors displaced from the tank 10 during fuel fill to flow quickly therethrough to the canister 16, but this path is not always open, as will be described next.

A selectively openable valve 32 is located within the primary venting line 22, specifically within the ribs 30 of housing 26. Valve 32 is generally cylindrical, although it may be conically chamfered at the upper end, as shown, and would ideally be formed of a tough, but buoyant material. A coil spring 34 compressed between the bottom wall of housing 26 and the bottom end of valve 32 normally biases the upper end of valve 32 into valve seat 28, closing off and blocking primary line 22. In order to allow for diurnal loss venting from a secondary tank venting line 36 runs from the front of tank 12 into the primary venting line 22 at a point between the canister 16 and the valve seat 28, thereby by passing the valve 32. Secondary tank venting line 36 has a cross sectional area substantially smaller than the primary tank venting line 22, and may also, if desired, include a reduced orifice 37 to even further restrict vapor flow. Thus, secondary line 36 provides diurnal loss tank venting without encouraging diurnal vapor formation, as would a line as large in diameter as the primary line 22. An advantage of the invention is that the primary venting line 22 may be relatively short, since it runs from the front of tank 10 and not from top of the filler pipe 12. Of course, the shorter a line, the less expensive, bulky and heavy it is. A further advantage is the way in which the secondary and primary venting lines meet to provide a complete vapor path to canister 16 for diurnal tank venting, which allows secondary line 36 to be even shorter. The way in which primary line 22 provides fill venting will be described next.

An annular seal 38 in the filler pipe 12 is sized so as to surround and seal the outside of filler nozzle 20 when it is inserted, blocking the flow of displaced tank fuel vapors to atmosphere out of the open end of filler pipe 12. A flapper door 40 securely pivoted inside of filler pipe 12 below seal 38 helps to block the escape of vapors to atmosphere after cap 14 is removed, but before nozzle 20 is inserted. The insertion of nozzle 20 pushes down and pivots flapper door 40 clockwise, causing a lever 42 that is rigid thereto to pivot up. A flexible cable 44 runs from lever 42 under a rounded bearing protrusion 46 junction between the body of tank 10 and filler pipe 12, through the flared end 24 of primary venting line 22 and finally to a round plate 48 that sits between the top coil of spring 34 and the bottom of valve 32. Thus, when nozzle 20 is inserted, the pivoting lever 42 pulls up on cable 44, which slides over the surfaces of 46 and 24, pulling down on plate 48 to compress spring 34, as shown in FIG. 1. Then, valve 32 falls away from valve seat 28, guided by ribs 30, opening up primary venting line 22 so that the tank vapors displaced during fuel fill can rapidly vent to canister 16 without restriction. Ribs 30 do not occupy enough volume in housing 26 to significantly interfere with that flow. As an additional advantage, the buoyancy of valve 32 allows it to float up if liquid fuel should rise through flared end 24, guided by ribs 30, to hit valve seat 28 and protect canister 16 from contamination by liquid fuel. A conventional weight and float type shut off valve 50 can be used beneath secondary venting line 36, if desired, to provide similar protection, as well as roll over protection. When nozzle 20 is pulled out and moves away from flapper door 40, spring 34 can again expand, simultaneously pushing valve 32 back to its closed position against valve seat 28 and pulling on plate 48 and cable 44 to pivot flapper door 40 back to its closed position, as seen in FIG. 1. This remote actuation of valve 32 within the primary venting line 22 means that is not necessary to have the valves mounted on the side of the filler pipe or the long filler pipe to canister venting lines found in the systems described above. Furthermore, the fact seal 38, flapper door 40, and cable 44 are all internal to the conventionally sized tank 10 and file pipe 12 adds to the compact quality and potentially lighter weight of the whole system.

Variations of the embodiment disclosed may be made within the spirit of the invention. For example, if the valve 32 were designed to not completely close off primary line 22, but to leave enough open area for diurnal venting, then it is possible that secondary venting line 36 could be dispensed with. However, the advantageous way in which the two lines 22 and 36 cooperate allows secondary line 36 to be quite short, and therefore not add a great deal of extra cost to the system. Remote actuation systems other than the cable 44 could be used to open and shut valve 32, but cable 44 is inexpensive, reliable, and compact. Therefore, it will be understood that the invention is not intended to be limited to just the preferred embodiment disclosed.

The embodiments of the invention in which an exclusive property or privilege is claimed are defined as follows:

1. In a vehicle fuel system having a fuel tank with a filler pipe at one end thereof that receives an inserted filler nozzle through its open end during fuel fill and a vapor canister mounted at the opposite end of said tank for storing fuel vapors produced in said tank, an improved, compact means for venting said vapors to said canister, comprising, a tank venting line running directly from said opposite end of said tank to said storage canister, said venting line having a cross sectional area sufficient to allow fuel vapors displaced from said tank during fuel fill to flow quickly therethrough to said canister, a selectively openable valve located within said venting line between said tank and canister which is normally biased to a closed position so as to block vapor flow therethrough, a seal in said filler pipe engageable with said filler nozzle when it is inserted so as to substantially block the flow of fuel vapors from said tank out said filler pipe open end, lever means located within said filler pipe and rotatable by the insertion of said fuel nozzle so as to open said valve only during fuel fill, and, a cable running from said lever through the inside of said tank and to said valve, whereby, during fuel fill, said lever means and cable will pull said valve open to allow the quick venting of fuel vapors from said tank to said canister through said tank venting line.

* * * * *